(12) United States Patent
Pettersson et al.

(10) Patent No.: US 9,475,485 B2
(45) Date of Patent: Oct. 25, 2016

(54) METHOD FOR MOVING OFF A HYBRID VEHICLE

(71) Applicant: SCANIA CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 127 days.

(21) Appl. No.: 14/410,669

(22) PCT Filed: Jun. 26, 2013

(86) PCT No.: PCT/SE2013/050787
§ 371 (c)(1),
(2) Date: Dec. 23, 2014

(87) PCT Pub. No.: WO2014/003668
PCT Pub. Date: Jan. 3, 2014

(65) Prior Publication Data
US 2015/0203102 A1    Jul. 23, 2015

(30) Foreign Application Priority Data
Jun. 27, 2012 (SE) ...................................... 1250716

(51) Int. Cl.
*B60W 20/00* (2016.01)
*B60K 6/365* (2007.10)
(Continued)

(52) U.S. Cl.
CPC .......... *B60W 20/1088* (2013.01); *B60K 6/365* (2013.01); *B60K 6/48* (2013.01);
(Continued)

(58) Field of Classification Search
CPC ...................... B60W 20/19; B60W 30/18027
See application file for complete search history.

(56) References Cited

U.S. PATENT DOCUMENTS

| 6,054,776 | A | 4/2000 | Sumi |
| 6,428,438 | B1 | 8/2002 | Bowen |
| 2013/0267367 | A1* | 10/2013 | Kaltenbach ............ B60K 6/365 475/5 |
| 2015/0142239 | A1* | 5/2015 | Pettersson .............. B60K 6/365 701/22 |

FOREIGN PATENT DOCUMENTS

| DE | 102 25 249 A1 | 12/2003 |
| DE | 10 2010 031 026 A1 | 1/2012 |

(Continued)

OTHER PUBLICATIONS

International Search Report dated Oct. 24, 2013 issued in corresponding International patent application No. PCT/SE2013/050787.
(Continued)

*Primary Examiner* — Derek D Knight
(74) *Attorney, Agent, or Firm* — Ostrolenk Faber LLP

(57) ABSTRACT

A method for moving off of a hybrid vehicle with a propulsion system (1) including a planetary gear with three components: a sun gear (10), a ring gear (11) and a planet wheel carrier (12). The output shaft (2a) of a combustion engine (2) is connected to a first component of an input shaft (3a) of a gearbox (3) is connected to a second component and the rotor (9b) of an electric machine (9) is connected to a third component. The propulsion system has a locking device transferable between a locking position and a releasing position respectively, in which the components rotate as a unit and with different rotation speeds respectively. The method starts from an initial state with the combustion engine idle, the locking device in the releasing position and a gear, appropriate for moving off, engaged in the gearbox. The electric machine is controlled to apply a positive torque on the third component of the planetary gear, and the rotation speed of the combustion engine is controlled towards a constant rotation speed. A reaction torque is created and gives rise to a demanded driving torque, whereby the vehicle moves off.

10 Claims, 3 Drawing Sheets

(51) Int. Cl.
*B60W 10/06* (2006.01)
*B60W 10/08* (2006.01)
*B60K 6/48* (2007.10)
*B60W 30/18* (2012.01)

(52) U.S. Cl.
CPC ............ *B60W 10/06* (2013.01); *B60W 10/08* (2013.01); *B60W 20/00* (2013.01); *B60W 20/19* (2016.01); *B60W 30/18027* (2013.01); *B60W 30/18063* (2013.01); *Y02T 10/6221* (2013.01); *Y02T 10/6286* (2013.01); *Y10S 903/93* (2013.01); *Y10T 477/23* (2015.01)

(56) References Cited

FOREIGN PATENT DOCUMENTS

DE   10 2010 031 029 A1   1/2012
EP   1 319 546            6/2003

OTHER PUBLICATIONS

International Preliminary Report on Patentability dated Sep. 18, 2014 issued in corresponding International patent application No. PCT/SE2013/050787.

\* cited by examiner

METHOD FOR MOVING OFF A HYBRID VEHICLE

CROSS-REFERENCE TO RELATED APPLICATIONS

The present application is a 35 U.S.C. §§371 National Phase conversion of PCT/SE2013/050787, filed Jun. 26, 2013, which claims priority of Swedish Patent Application No. 1250716-6, filed Jun. 27, 2012, the contents of which are incorporated by reference herein. The PCT International Application was published in the English language.

FIELD OF THE INVENTION AND PRIOR ART

The present invention relates to a method for moving off a vehicle.

The invention is especially, but not exclusively, directed to carrying out such a method for motor vehicles in the form of wheeled utility vehicles, especially heavy vehicles, such as trucks and buses.

The inventive method relates to moving off a so-called hybrid vehicle, which generally is a vehicle which may be driven by a primary engine, here a combustion engine, and a secondary engine, here an electric machine. The electric machine is suitably provided with at least one hybrid energy storing means, for example a battery or a capacitor, for storing electric energy and regulating equipment for regulating the flow of electric energy between the energy storing means and the electric machine. The electric machine may thereby alternately operate as a motor or a generator depending on the state of operation of the vehicle. When a brake is applied to the vehicle, the electric machine generates electric energy which may be stored and/or utilised directly. The stored electric energy may later be utilized, for example for driving the vehicle.

The utilization of a conventional clutch mechanism connecting the input shaft of the gearbox with the combustion engine upon take-off of the vehicle and disconnecting it during a gear changing process in the gearbox involves disadvantages, such as heating of the discs of the clutch mechanism, which results in an increased fuel consumption and a wear of the clutch discs. This is particularly relevant upon connection of the shafts. Furthermore, a conventional clutch mechanism is relatively heavy and costly. It also occupies a relatively large space in the vehicle. Friction losses also occur upon use of a hydraulic converter/torque transformer commonly used in automatic gearboxes.

The conventional clutch mechanism as well as the hydraulic converter and disadvantages associated therewith may be avoided by providing the vehicle with a propulsion system in which the output shaft of the combustion engine, the rotor of the electric machine and the input shaft of the gearbox are interconnected by a planetary gear. A vehicle having a propulsion system of this type is known through EP 1 319 546. There is of course an ongoing attempt to improve the way to drive a vehicle having such a propulsion system with respect to energy efficiency and the way that the electric machine and the combustion engine interact.

SUMMARY OF THE INVENTION

The object of the present invention is to provide a method of the sort initially defined considering the attempt mentioned above.

Since, the invention uses both the torque of the electric machine and the torque of the combustion engine to drive the input shaft of the gearbox during the process of moving off, a higher torque can be extracted. Since the propulsion system is clutch free, this torque can be exerted without wear, in contrast to a so-called parallel hybrid vehicle, in which a corresponding torque is exerted only at the cost of wear of the clutch discs. Thanks to the high available torque, the vehicle may be moved off with a relatively high gear engaged in the gearbox, which means that the number of gear changes during the acceleration phase can be reduced.

Another advantage of the inventive method is that the electric machine is torque controlled, which means that it is controlled to apply a certain torque and not to reach a certain rotation speed, while as the combustion engine is rotation speed controlled, meaning that it is controlled to reach a certain rotation speed and not to apply a certain torque. Since the electric machine is less inert than the combustion engine, it is advantageous to control the torque of the electric machine and to control the rotation speed of the combustion engine. The lower inertia of the electric machine results in faster reactions in the propulsion system than are had with the combustion engine which is torque controlled. The connection between the demanded torque and the reaction torque on the input shaft of the gearbox thereby becomes stronger.

An additional advantage of the inventive method is that its energy storing means, in contrast to that of a parallel hybrid vehicle, is charged at the beginning of the process of moving off since the electric machine in this phase functions as a generator. The vehicle is thereby not dependent on having a well charged energy storing means in order to move off. Since the energy storing means is recharged each time the vehicle is moved off, the energy storing means is only slowly discharged, which is an advantage, particularly if the vehicle is driven slowly with frequent stopping and moving off procedures.

According to one embodiment of the invention, the steps of moving off are preceded by the steps:
(i) checking demanded driving torque, and
(ii) calculation of the torque that the electric machine must apply on the third component of the planetary gear in order to reach the demanded driving torque.

This embodiment discloses how the driving torque demanded by the driver of the vehicle is given by controlling the torque of the electric machine.

According to one embodiment of the invention, the steps of moving off are followed by the step:
transferring a locking means to the locking position when the components of the planetary gear rotate with the same rotation speed.

This embodiment in most cases provides the most efficient energy transfer between the combustion engine and the electric machine. Efficient transfer to the drive wheels of the vehicle can be achieved, primarily since electric losses in the electric machine are avoided, but also since losses in the planetary gear are eliminated.

According to one embodiment, the constant rotation speed of the combustion engine corresponds to the idle rotation speed of the combustion engine. It is advantageous to let the combustion engine operate at a rotation speed that is as low as possible in order to minimize internal losses in the combustion engine, such as friction losses and losses due to pump work, and the idle rotation speed is usually the lowest rotation speed at which the combustion engine produces an even torque.

According to one embodiment, no torque acts on the input shaft of the gearbox during the initial state. On flat ground, the vehicle thus stands still without need to apply a brake.

According to another embodiment, in its initial state, the electric machine applies a base torque indirectly acting on the input shaft of the gearbox. In this embodiment, the propulsion system of a vehicle with an automatic gearbox applies a driving torque immediately upon easing off the brake after a stop, without need for the driver of the vehicle to press the accelerator. According to a further development of this embodiment, the base torque is only applied where the service brake of the vehicle is not applied. When the driver eases off the service brake, a base torque is thus immediately applied and the vehicle is driven forward, without need to apply the base torque during the time when the driver has the service brake applied.

According to one embodiment of the invention, the method is carried out for a propulsion system wherein the first component is the sun gear, the second component is the planet wheel carrier and the third component is the ring gear. Such a propulsion system was previously disclosed in the unpublished SE 1051384-4. By connecting the electric machine to the ring gear and the output shaft of the combustion engine to the sun gear, a compact construction is achieved, which is easy to fit into already existing spaces for propulsion systems having clutch mechanisms instead of planetary gears. A hybridised gearbox may thereby be made size and weight compatible with a standard gearbox, and standardised interfaces may be maintained. This means that the weight increase normally associated with hybridisation may be reduced considerably. Another advantage is that a connection of the electric machine to the ring gear gives a higher possible brake torque associated with the electric machine than had it instead been connected to the sun gear. Another advantage associated with this embodiment is that the transmission conditions become such that the electric machine reaches its maximum torque at the same time that the combustion engine reaches its maximum torque at idle rotation speed. This minimizes the fuel consumption and the sound level when moving off.

The invention also relates to a computer program which controls the process, an electronic control unit having the control features and a vehicle having the control unit and/or the features disclosed.

BRIEF DESCRIPTION OF THE DRAWINGS

The invention will in the following be further described by means of example with reference to the appended drawings, wherein.

DETAILED DESCRIPTION OF EMBODIMENTS OF THE INVENTION

Figure 1:
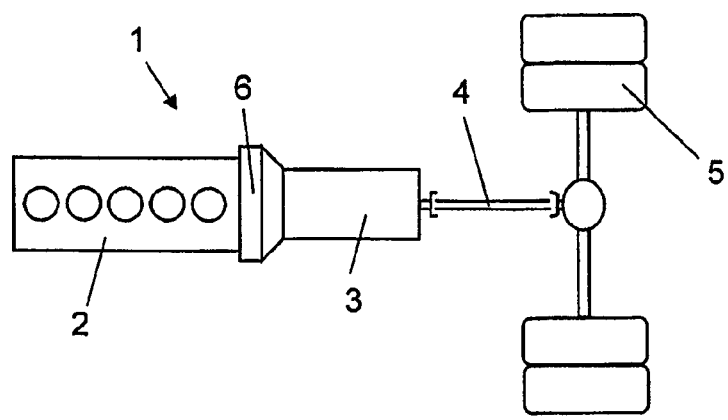
FIG. 1 is a schematic drawing of a propulsion system of a vehicle for which a method according to the invention may be carried out.

FIG. 1 shows a propulsion system 1 for a heavy vehicle. The propulsion system comprises a combustion engine 2, a gearbox 3, a number of drive shafts 4 and drive wheels 5. Between the combustion engine 2 and the gearbox 3 the propulsion system 1 comprises an intermediate portion 6.

Figure 2:
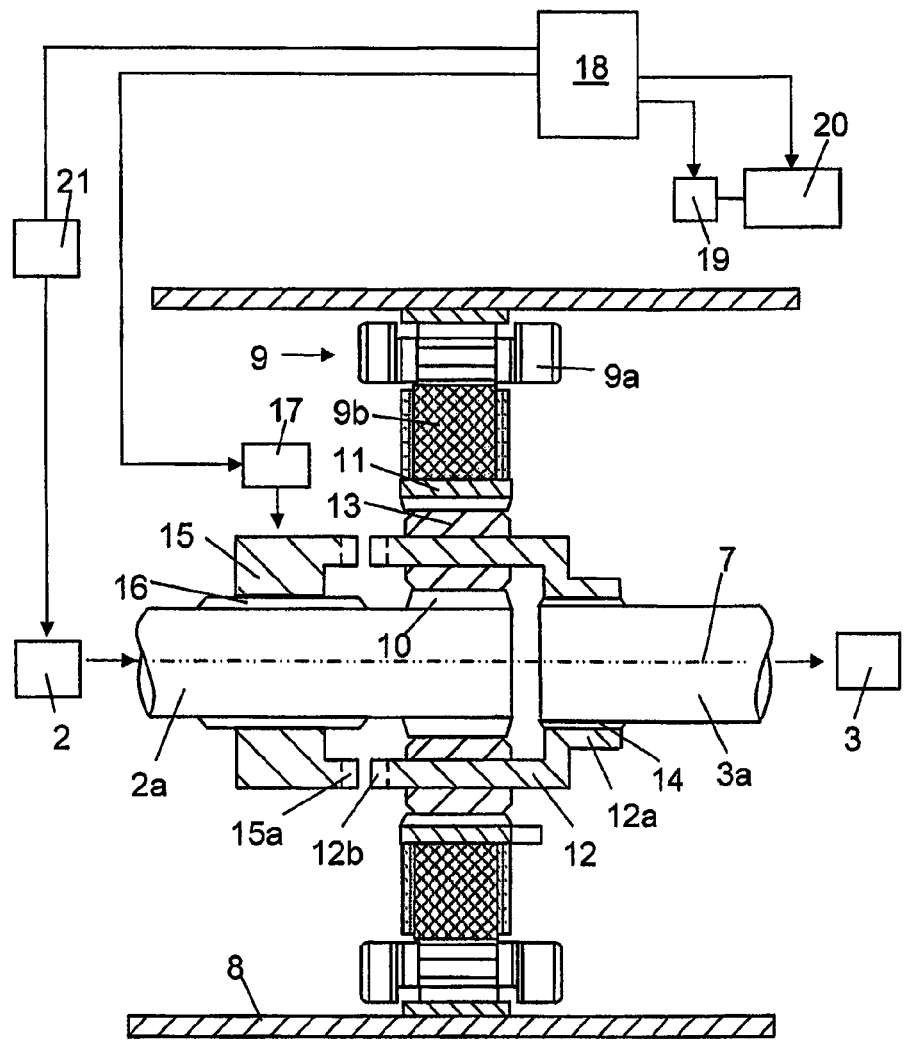
FIG. 2 is a simplified view of a part of a propulsion system.

FIG. 2 shows a more detailed view of the components in the intermediate portion 6. The combustion engine 2 is provided with an output shaft 2a and the gear box 3 with an input shaft 3a in the intermediate portion 6. The output shaft 2a of the combustion engine is coaxially arranged with respect to the input shaft 3a of the gear box. The output shaft 2a of the combustion engine and the input shaft 3a of the gear box are arranged to rotate around a common rotation axis 7. The intermediate portion 6 comprises a housing 8 enclosing an electric machine 9 and a planetary gear. The electric machine 9 comprises as usual a stator 9a and a rotor 9b. The stator 9a comprises a stator core secured in a suitable way on the inside of the housing 8. The stator core comprises the windings of the stator. In certain operation situations, the electric machine 9 utilizes stored electric energy for supplying propelling force to the input shaft 3a of the gearbox. In other operation situations, the electric machine utilizes kinetic energy of the input shaft 3a of the gear box to extract and store electric energy.

The planetary gear is arranged essentially radially internally of the stator 9a and the rotor 9b of the electric machine. The planetary gear comprises a first component, a second component and a third component. The first component is in this embodiment a sun gear 10, the second component is a planet wheel carrier 12, and the third component is a ring gear 11. The planet wheel carrier 12 carries a number of gear wheels 13 which are rotatably arranged in a radial space between the teeth of the sun gear 10 and the ring gear 11. The sun gear 10 is in this embodiment secured to a circumferential surface of the output shaft 2a of the combustion engine. The sun gear 10 and the output shaft 2a of the combustion engine are here arranged to rotate as a unit with a first rotation speed $n_1$. The planet wheel carrier 12 comprises a fastening portion 12a which in this embodiment is fastened to a circumferential surface of the input shaft 3a of the gearbox by means of a splined connection 14. By means of this connection, the planet wheel carrier 12 and the input shaft 3a of the gearbox may rotate as a unit with a second rotation speed $n_2$. The ring gear 11 comprises an external circumferential surface onto which the rotor 9b in this embodiment is secured. The rotor 9b and the ring gear 11 here form a rotatable unit arranged to rotate with a third rotation speed $n_3$.

The propulsion system 1 comprises locking means for interlocking two of the components of the planetary gear. The locking means are in this embodiment arranged on the output shaft 2a of the combustion engine and on the planet wheel carrier 12 by means of a displaceable coupling member 15 provided on the output shaft 2a of the combustion engine. The coupling member 15 via a coupling portion 15a is connectable to a coupling portion 12b of the planet wheel carrier 12. The coupling member 15 is fastened to the output shaft 2a of the combustion engine by means of a splined connection 16. The coupling member 15 is in this case fixed against rotation to the output shaft 2a of the combustion engine and is displaceable in an axial direction on the output shaft 2a of the combustion engine. A schematically illustrated displacing member 17 is adapted to displace the coupling member 15 between a first position in which the coupling portions 15a, 12b are not mutually engaged, corresponding to a releasing position of the locking means, and a second position in which the coupling portions 15a, 12b are mutually engaged, corresponding to a locking position of the locking means. When the coupling portions 15a, 12b are mutually engaged, the output shaft 2a of the combustion engine and the input shaft 3a of the gearbox will be interlocked. These two axes 2a, 3a and the rotor 9b of the electric machine will thereby rotate at the same rotation speed.

According to another embodiment of the invention, the inventive method is performed by out for a propulsion system wherein the locking means comprise a casing provided with a first set of splines. In the releasing position this first set of splines engages with a second set of splines provided on the second component of the planetary gear, which second component is connected to the input shaft of the gearbox. In the locking position, the first set of splines also engages with a third set of splines arranged on the first component of the planetary gear, which first component is connected to the output shaft of the combustion engine, so that the first and second components are interlocked. The casing may for example be a ring shaped casing, which encloses the planet wheel carrier in the case where the second component of the planetary gear consists thereof.

The locking means may of course also be arranged in other ways than mentioned above, for example so that these interlock the ring gear and the output shaft of the combustion engine or the input shaft of the gearbox.

In the illustrated embodiment, an electric control unit 18 is operable to control the displacing member 17. The control unit 18 is also operable to determine the occasions on which the electric machine 9 shall operate as a motor and on which occasions it shall operate as a generator. In order to make this decision, the control unit 18 may receive current information about suitable operating parameters. The control unit 18 may be a computer with suitable software for this task. The control unit 18 also controls, as schematically shown, regulating equipment 19 regulating the flow of electric energy between an energy storing means 20, such as a hybrid battery, and the stator 9a of the electric machine. On occasions when the electric machine operates as a motor, stored electric energy is supplied from the energy storing means 20 to the stator 9a and/or to other consumers. On occasions when the electric machine operates as a generator, electric energy is supplied from the stator 9a to the energy storing means 20. The energy storing means 20 delivers and stores electric energy with a voltage on the order of 200-800 Volt. Since the intermediate portion 6 between the combustion engine 2 and the gearbox 3 in a vehicle is restricted, it is required that the electric machine 9 and the planetary gear constitute a compact unit. The components 10-12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are here arranged to rotate around a common axis of rotation 7. Through such a design, the electric machine 9 and the planetary gear occupies a comparatively small space. The vehicle 1 is provided with a motor control function 21 through which the rotation speed $n_1$ of the combustion engine may be regulated. The control unit 18 thereby has a possibility to activate the motor control function 21 upon engagement and disengagement of gears in the gearbox 3 in order to create a state of zero torque in the gearbox 3. The propulsion system may of course, instead of being controlled by one single control unit 18, be controlled by several different control units.

Figure 3:
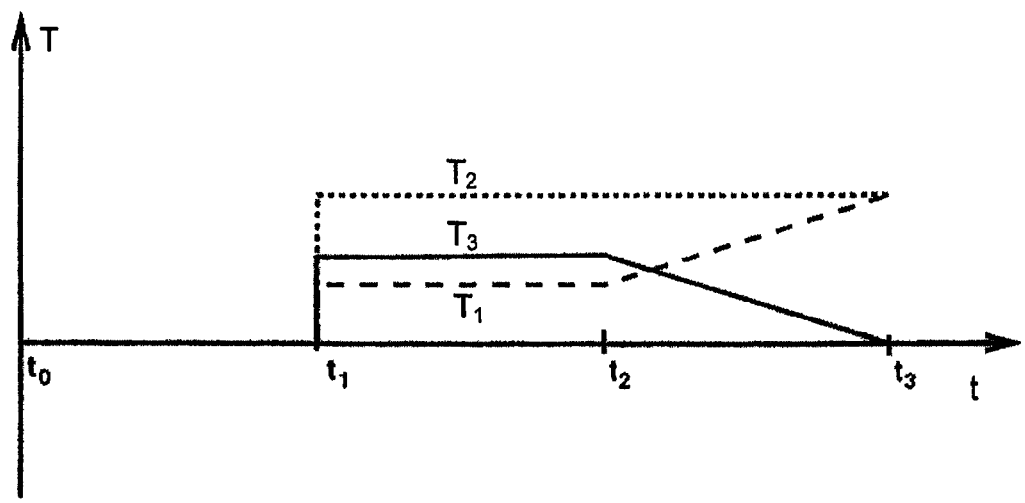
FIG. 3 shows how the torque of the different components in the propulsion system can vary over time when carrying out the method.
Figure 4:
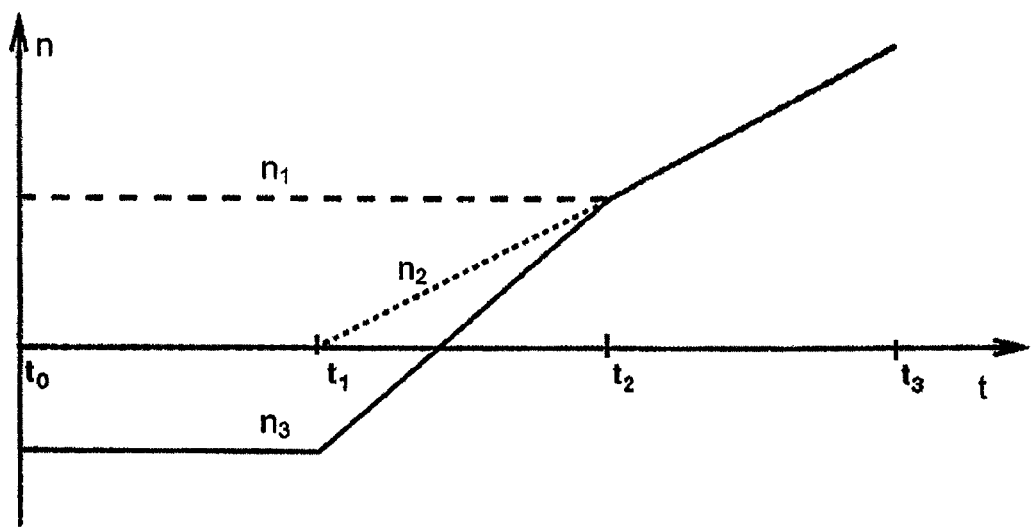
FIG. 4 shows how the rotation speed of the components in FIG. 3 can vary over time when carrying out the method.
Figure 6:
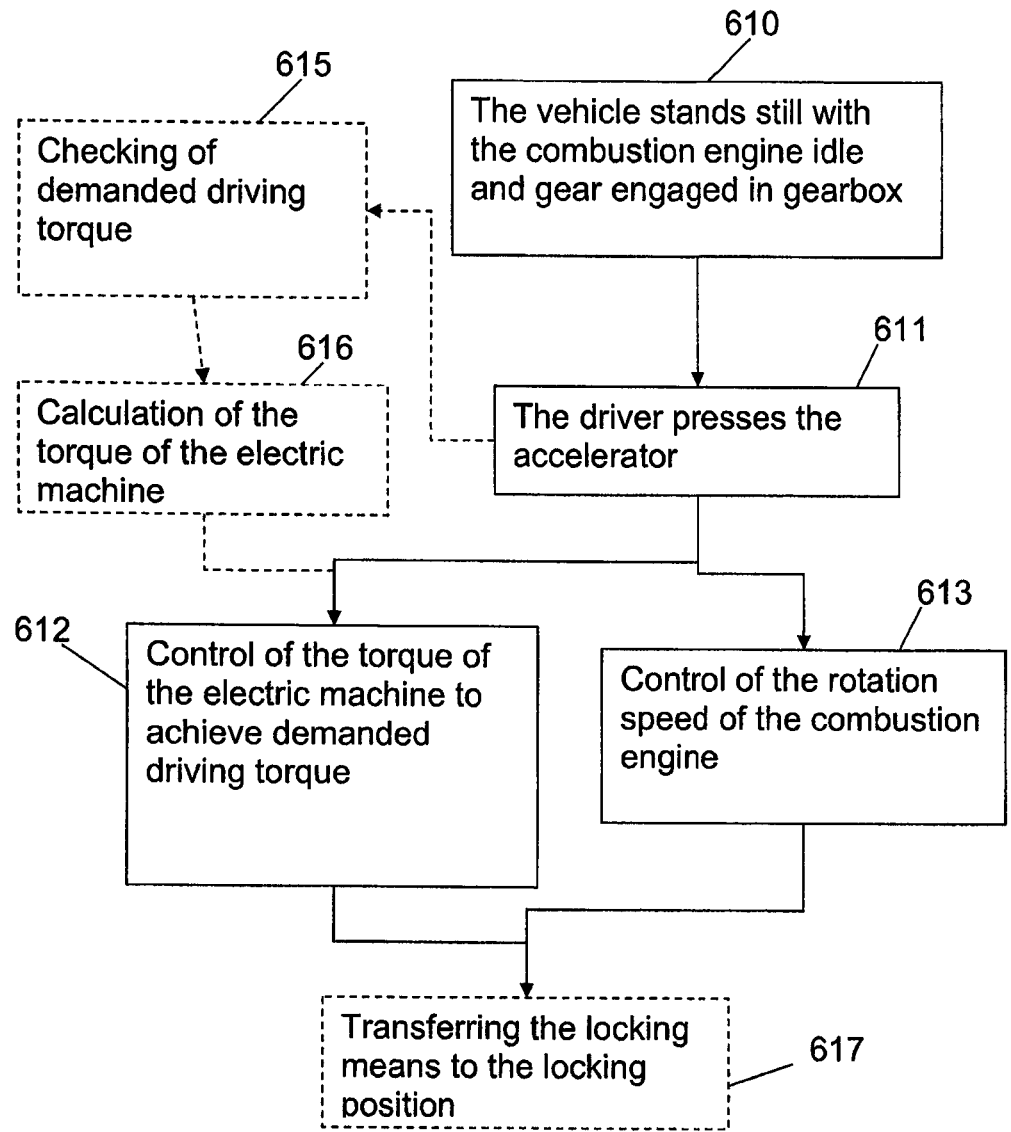
FIG. 6 is a flow chart illustrating a method according to the invention.

FIGS. 3 and 4 show how the torques $T_1$, $T_2$ and $T_3$ and the rotation speeds $n_1$, $n_2$ and $n_3$ for the output shaft 2a of the combustion engine (dashed line), the input shaft 3a of the gearbox (dotted line) and the rotor 9b of the electric machine (solid line), respectively, may vary over time t while carrying out an embodiment of the method according to the invention. By definition, the combustion engine 2, which only rotates one way, rotates with a positive rotation speed. Components rotating in the same direction as the combustion engine thereby by definition rotate with a positive rotation speed and components rotating in an opposite direction by definition rotate with a negative rotation speed. FIG. 6 shows a flow chart illustrating the method. The basic steps according to the invention are in FIG. 6 marked with solid lines, while steps according to an embodiment of the invention are marked with dashed lines. In the embodiment of the inventive method described herein, a propulsion system 1 in which the rotor 9b of the electric machine is arranged to rotate as a unit with the ring gear 11, the output shaft 2a of the combustion engine is arranged to rotate as a unit with the sun gear 10 and the input shaft 3a of the gearbox is arranged to rotate as a unit with the planet wheel carrier 12 is used.

During the time $t=t_0-t_1$, the vehicle is in an initial state 610 appropriate for moving off. In the initial state shown in FIGS. 3 and 4, the vehicle is standing still with the combustion engine 2 idling, the locking means in the releasing position and an appropriate gear for moving off engaged in gearbox 3. The gearbox 3 is in a state of zero torque, which means that no torque $T_2$ is applied to the input shaft 3a of the gearbox. Since the combustion engine 2 is idling, the output shaft 2a of the combustion engine, and thereby the sun gear 10, with the rotation speed $n_1$. The rotor 9b of the electric machine thus rotates with the rotation speed $n_3$ that it is given via the planetary gear by the rotation of the sun gear 10.

At the time $t=t_1$, the driver wants to move off and so presses the accelerator of the vehicle, in a step 611, the accelerator of the vehicle. A signal is given via the control unit 18 to the electric machine 9 that a driving torque is demanded. The electric machine 9 is in a step 612 controlled so as to apply a positive torque $T_3$ on the ring gear 11. In the embodiment shown, the applied torque is a constant positive torque. The size of the torque $T_3$ applied by the electric machine 9 depends on the pressure on the accelerator: the higher the demanded acceleration, the higher is the applied torque. At the same time, in step 613 the rotation speed $n_1$ of the combustion engine 2 is regulated by means of the motor control function 21, such that it is kept constant at the idle rotation speed. Since the positive torque $T_3$ of the electric machine 9 acts to reduce the rotation speed $n_1$ of the combustion engine 2, this causes the motor control function 21, to control the combustion engine so that it applies a positive torque $T_1$ acting on the sun gear 10 in order to maintain the rotation speed of the combustion engine 2. This causes a resulting positive torque $T_2$ acting on the input shaft 3a of the gearbox. The input shaft 3a of the gearbox is thereby accelerated and the vehicle moves off. At the time $t=t_1$ and shortly thereafter, the rotor 9b of the electric machine rotates with a negative rotation speed and therefore functions as a generator, which transfers electric energy to the energy storing means 20. However, after this time, the rotation velocity of the rotor 9b of the electric machine decreases so that its rotation speed goes towards zero. The rotor thereafter changes its direction of rotation and gradually increases its rotation speed. The velocity of the vehicle is thereby increased and the rotation speed $n_1$ of the combustion engine is maintained constant, while the electric machine 9 is controlled to apply a constant positive torque $T_3$. From the change of direction of rotation, the electric machine 9 functions as a motor, which consumes energy from the energy storing means 20.

At the time $t=t_2$, all the components 10, 11, 12 of the planetary gear have reached the same rotation speed. In a step 617 the planetary gear may then be locked by transferring the locking means to the locking position. The components 10, 11, 12 then rotate as a unit with the same rotation speed. Each of the torques $T_3$, $T_1$ of the electric machine 9 and the combustion engine 2, respectively, are thereafter controlled towards the distribution which is most favorable for continued driving. In the embodiment shown, the torque of the electric machine 9 is controlled towards zero while the torque of the combustion engine 2 is controlled towards the demanded torque on the input shaft 3a of the gearbox, so that the vehicle at the time $t=t_3$ is entirely driven by the combustion engine 2.

Instead of locking the planetary gear at the time $t=t_2$, the method may continue with the locking means in a releasing position, which can be appropriate during driving with low requisite driving torques, for example lower than 300 Nm depending on the design of the propulsion system.

To ensure that the torque $T_2$ acting on the input shaft 3a of the gearbox corresponds to the driving torque demanded by the driver, it is appropriate to carry out a control step 615 when the driver presses the accelerator that control step, the demanded torque is checked by the control unit 18. In a step 616, a calculation of the torque $T_3$ that the electric machine must apply to the ring gear 11 during the process of moving off in order to reach said demanded driving torque is thereafter performed, wherein the torque $T_3$ for the embodiment shown in the drawings is given by $$T_3 = \frac{Z_r}{Z_r + Z_s} T_2,$$

where $z_r$ is the number of teeth of the ring gear and $z_s$ is the number of teeth of the sun gear.

The rotation speed $n_1$ of the combustion engine 2 is controlled to minimise internal losses in the combustion engine, such as friction losses and losses due to pump work, and suitably towards the lowest rotation speed at which a combustion engine can produce an even torque $T_1$, which is normally the idle rotation speed of the combustion engine 2. If the vehicle is heavily loaded, it may be an advantage to instead control the rotation speed $n_1$ towards an elevated value. Typically the idle rotation speed is about 500 rpm, and a maximum elevated level can in that case be about 1 000 rpm.

In the embodiment of the invention shown in the drawings, the gearbox is in the initial state in a state of zero torque. It is instead possible to let the electric machine 9 apply a certain base torque in the initial state, which base torque acts on the input shaft 3a of the gearbox via the planetary gear. The vehicle will in that case be driven slowly forward if no brake is acting on the shaft 3a, such as the service brake of the vehicle. In this embodiment, the way in which a propulsion system of a vehicle with an automatic gearbox applies a driving torque immediately upon easing off the service brake is imitated. In a further development of this embodiment, it is possible to let the electric machine apply a base torque only in the case where the service brake of the vehicle is not applied. When the vehicle is standing still with the service brake applied, no base torque is in this case applied, but as soon as the driver eases off the service brake, a base torque is applied and the vehicle moves off.

As an alternative to the above mentioned embodiment, the method may be carried out for a propulsion system with the output shaft of the combustion engine connected to the ring gear and the rotor of the electric machine connected to the sun gear. It is also possible to instead connect the input shaft of the gearbox to either the ring gear or the sun gear. In these cases, as described above, the output shaft of the combustion engine, the input shaft of the gearbox and the rotor respectively, may be connected to the first, second and third component, respectively, of the planetary gear, either so that each rotates with the same rotation speed as the corresponding component or at a fixed or at a variable transmission ratio.

Computer program code for implementing a method according to the invention is suitably included in a computer program which is readable into a non-volatile internal memory of a computer, such as the internal memory of an electronic control unit of a motor vehicle. Such a computer program is suitably provided through a computer program product comprising a non-volatile data storing medium readable by an electronic control unit, which data storing medium has the computer program stored thereon. Said data storing medium is for example an optical data storing medium in the form of a CD-ROM-disc, a DVD-disc, or similar, a magnetic data storing medium in the form of a hard disc, a diskette, a tape or similar, or a Flash memory or a memory of the type ROM, PROM, EPROM or EEPROM.

Figure 5:
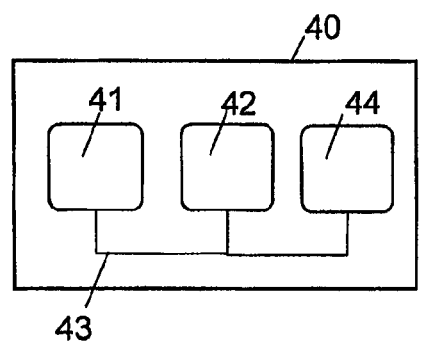
FIG. 5 is a schematic drawing of a control unit for implementing a method according to the invention.

FIG. 5 illustrates very schematically an electronic control unit 40 comprising an execution means 41, such as a central processor unit (CPU), for executing a computer program. The execution means 41 communicates with a memory 42, for example of the RAM type, through a data bus 43. The control unit 40 comprises also a data storing medium 44, for example in the form of a Flash memory or a memory of the type ROM, PROM, EPROM or EEPROM. The execution means 41 communicates with the data storing medium 44 through the data bus 43. A computer program comprising computer program code for implementing a method according to the invention is stored on the data storing medium 44.

The invention is of course not in any way restricted to the embodiments described above, but many possibilities to modifications thereof would be apparent to a person with skill in the art without departing from the scope of the invention as defined in the appended claims.

The invention claimed is:

1. A method for moving off a vehicle the vehicle having a propulsion system, which comprises a combustion engine with an output shaft, an electric machine comprising a stator and a rotor, a gearbox with an input shaft, and a planetary gear comprising three components in the form of a sun gear, a ring gear and a planet wheel carrier;

the output shaft of the combustion engine being connected to a first of the components of the planetary gear so that rotation of the output shaft of the combustion engine causes rotation of the first component, the input shaft of the gearbox is connected to a second of the components of the planetary gear so that rotation of the input shaft of the gearbox causes rotation of the second component and the rotor of the electric machine is connected to a third of the components of the planetary gear, so that rotation of the rotor causes rotation of the third component;

the propulsion system further comprises locking means transferrable between a locking position in which two of the components are interlocked, such that the three components rotate as a unit with the same rotation speed, and a releasing position, in which the components are allowed to rotate with different rotation speeds;

the method comprising:

the method starting from an initial state of setting the combustion engine to rotate with idle speed, setting the locking means in the releasing position and engaging an appropriate gear in a gear box for moving off the vehicle and then performing the following steps:

(a) controlling the torque of the electric machine so that the electric machine applies a positive torque on the third component of the planetary gear, (b) controlling the rotation speed of the combustion engine towards a constant or an essentially constant rotation speed, performing steps (a) and (b) simultaneously so that a reaction torque acting on the input shaft of the gear box is created and gives rise to a demanded driving torque, whereby the vehicle moves off, preceding steps (a) and (b) by performing the steps of:

(i) checking the demanded driving torque, (ii) calculating the torque that the electric machine in step (a) must apply on the third component of the planetary gear in order to reach the demanded driving torque.

2. The method according to claim 1, further comprising following the steps (a) and (b) by the step of:

(c) transferring the locking means to the locking position when the components of the planetary gear rotate at the same rotation speed.

3. The method according to claim 1, wherein the constant rotation speed in step (b) corresponds to the idle rotation speed of the combustion engine.

4. The method according to claim 1, further comprising no torque acts on the input shaft of the gearbox during the initial state.

5. The method according to claim 1, further comprising in the initial state, the electric machine applies a base torque indirectly acting on the input shaft of the gearbox.

6. The method according to claim 5, wherein the base torque is applied only where the service brake of the vehicle is not applied.

7. The method according to claim 1, performed for a propulsion system wherein the first component of the planetary gear is the sun gear, the second component of the planetary gear is the planet wheel carrier, and said third component of the planetary gear is the ring gear.

8. A computer program product comprising a non-volatile data storing medium readable by a computer, computer program code of a computer program stored in the medium, the computer program code being configured for causing a computer to implement a method according to claim 1 when the computer program code is executed in the computer.

9. An electronic control unit comprising execution means, a memory connected to the execution means and a non-volatile data storing medium connected to the execution means, a computer program code of a computer program being stored on the data storing medium, the computer program code being configured for causing a computer to implement a method according to claim 1 when the computer program code is executed in the computer.

10. A vehicle comprising an electronic control unit according to claim 9.

* * * * *